(12) United States Patent
Gomes et al.

(10) Patent No.: US 7,261,552 B2
(45) Date of Patent: Aug. 28, 2007

(54) INTEGRATED MULTIPLE EDGE GATE

(75) Inventors: Manuel Gomes, Flamborough (CA); Harald Gaul, Shanty Bay (CA); Bounoth Meksavanh, Mississauga (CA); Beilei Yen, Mississauga (CA)

(73) Assignee: XS Plastics Inc., Tecumseh, Ontatrio (CA)

( * ) Notice: Subject to any disclaimer, the term of this patent is extended or adjusted under 35 U.S.C. 154(b) by 300 days.

(21) Appl. No.: 11/114,146

(22) Filed: Apr. 26, 2005

(65) Prior Publication Data

US 2006/0134262 A1 Jun. 22, 2006

Related U.S. Application Data

(60) Provisional application No. 60/637,445, filed on Dec. 21, 2004.

(51) Int. Cl.
B29C 45/20 (2006.01)
(52) U.S. Cl. .................................. 425/549; 425/572
(58) Field of Classification Search ................ 425/572, 425/549
See application file for complete search history.

(56) References Cited

U.S. PATENT DOCUMENTS

| | | | | |
|---|---|---|---|---|
| 4,219,323 A | * | 8/1980 | Bright et al. ................ | 425/572 |
| 4,345,892 A | * | 8/1982 | Schulte et al. .............. | 425/549 |
| 5,268,184 A | * | 12/1993 | Gellert ........................ | 425/549 |
| 5,269,676 A | * | 12/1993 | Gellert ........................ | 425/549 |
| 5,324,191 A | * | 6/1994 | Schmidt ...................... | 425/549 |
| 2002/0121713 A1 | * | 9/2002 | Moss et al. .................. | 425/149 |
| 2002/0168442 A1 | * | 11/2002 | Gould et al. ................. | 425/549 |

* cited by examiner

*Primary Examiner*—Tim Heitbrink
(74) *Attorney, Agent, or Firm*—Borges & Rolle LLP

(57) ABSTRACT

The present invention is an improved injection molding nozzle. The improved nozzle includes a nozzle body having a central melt channel and a terminal end. A distributor block is formed on the terminal end of the nozzle body, the distributor block having a nozzle melt channel and a series of distributor melt channels radiating from the nozzle melt channel. The nozzle melt channel is coupled to the central melt channel and each distributor melt channel terminates in a melt well. The improved nozzle further includes a nozzle ring which is formed on the end of the terminal end of the nozzle. The nozzle ring surrounds the distributor block and has a plurality of gate feeders, each of said gate feeders being in communication with a melt well. The distributor melt channels radiate symmetrically from the nozzle melt channel to feed the melt wells. The distributor block is made of a highly thermally conductive alloy such as BeCu and a heating mantle is provided on the nozzle body for keeping the nozzle at a suitable melt temperature.

20 Claims, 4 Drawing Sheets

INTEGRATED MULTIPLE EDGE GATE

CROSS REFERENCE TO RELATED APPLICATION

This application claims the benefit of priority from provisional application No. 60/637,445 filed Dec. 21, 2004, the entirety of which is incorporated herein by reference.

FIELD OF THE INVENTION

The invention relates generally to injection molding nozzles.

BACKGROUND OF THE INVENTION

The injection molding of small items such as lipstick cases or small bottle caps may be done using an injection nozzle having a single gate. Due to the practical sizes of injection nozzles, multi-cavity molds using single gated nozzles tend to be complicated and expensive due to the number of nozzles required. Furthermore, such molds generally provide only a relatively small number of cavities, again due to the physical dimensions of the nozzle. Multiple gate nozzles have been used; however, multiple gate nozzles tend to be larger and bulkier than there single gate equivalents. Therefore, there remains a need for an improved nozzle design which permits the easy construction of multi-cavity molds.

SUMMARY OF THE INVENTION

In accordance with the present invention, there is provided an improved injection molding nozzle. The improved nozzle includes a nozzle body having a central melt channel and a terminal end. A distributor block is formed on the terminal end of the nozzle body, the distributor block having a nozzle melt channel and a series of distributor melt channels radiating from the nozzle melt channel. The nozzle melt channel is coupled to the central melt channel and each distributor melt channel terminates in a melt well. The improved nozzle further includes a nozzle ring which is formed on the end of the terminal end of the nozzle. The nozzle ring surrounds the distributor block and has a plurality of gate feeders, each of said gate feeders being in communication with a melt well.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

In the drawings like characters of reference indicate corresponding parts in the different figures.

DETAILED DESCRIPTION OF THE INVENTION

Figures 1, 2:
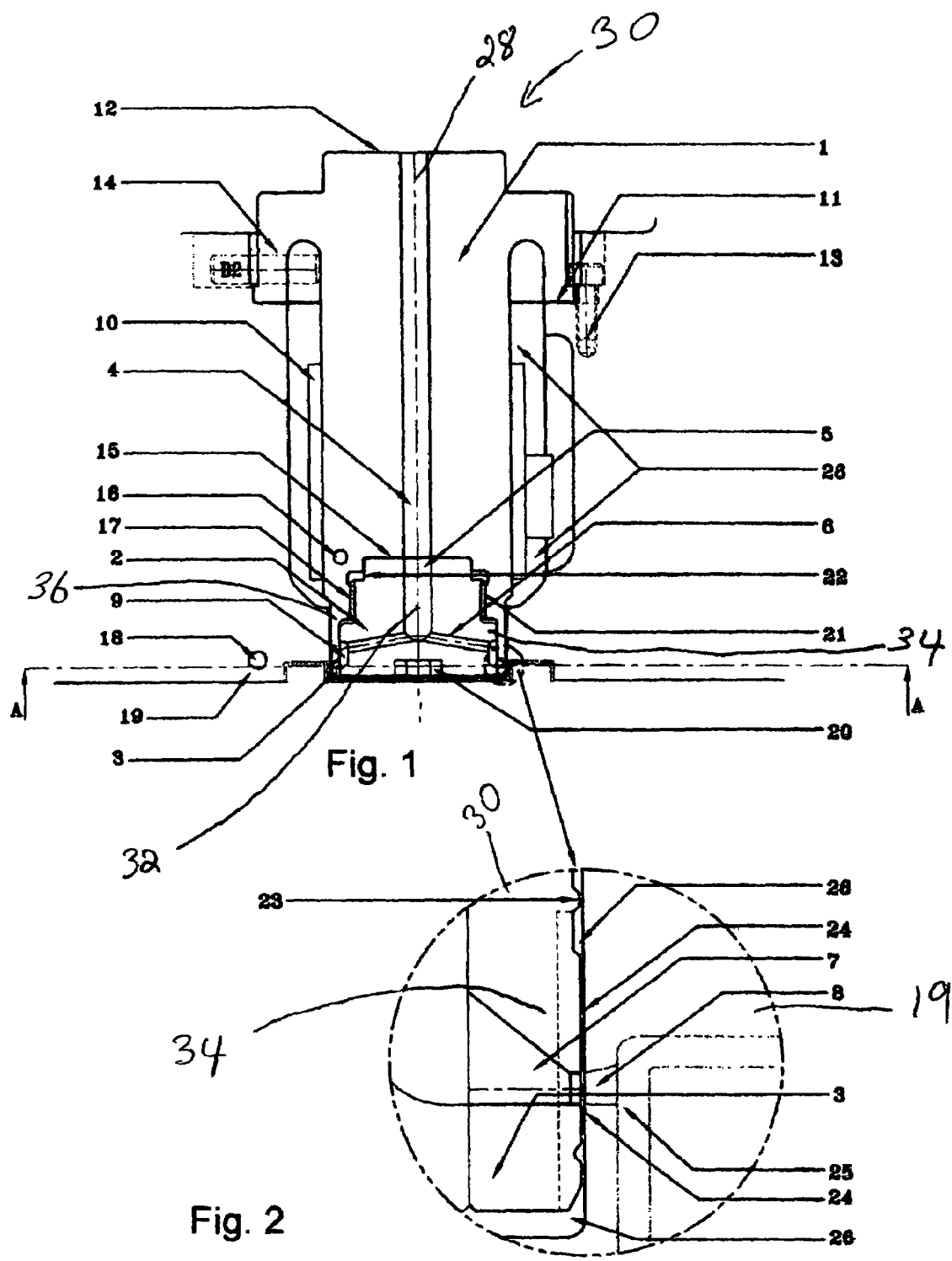
FIG. 1. is a cross-sectional view of an injection nozzle made in accordance with the invention.
FIG. 2. is a cross-sectional view of a portion of the injection nozzle shown in FIG. 1.

The present invention is an improved nozzle having multiple integrated edge gates. The multiple edge gates permit the nozzle to fill a plurality of small mold cavities surrounding the nozzle. Referring firstly to FIGS. 1 and 2, an injection nozzle made in accordance with the present invention is shown generally as item 30 and consists of nozzle core 1 having main melt channel 4, manifold seating 12 for attachment to a manifold (not shown), and axis 28. Nozzle body 1 is provided with support flanges 11 to aid in mounting the nozzle core via hold down screws 13. Main melt channel 4 is coaxial with axis 28. Nozzle body 1 has a bottom portion 36 opposite seating 12. Multi-nozzle ring 3 is formed on bottom portion 36 of nozzle body 1. Multi-nozzle ring 3 is substantially annular and has a circumferential edge 40 with a plurality of gate feeders 7 positioned there along. Multi-nozzle ring 3 is dimensioned and configured to receive distributor block 2. Distributor block 2 is substantially cylindrical and has axis 32 and peripheral edge 34 Distributor block 2 has a centrally located nozzle melt channel 5 and a plurality of distributor melt channels 6 radiating from the nozzle melt channel to peripheral edge 34. Nozzle melt channel 5 and main melt channel 4 are coaxially aligned.

Distributor block 2 is physically mounted within portion 36 of nozzle body 1 by thread set 21 or by any other suitable means such that the distributor block is in intimate physical contact with the nozzle body. Heating element 10 is wrapped around nozzle body 1 and provides a means of heating the nozzle body to a temperature sufficient to prevent nozzle freeze up. Distributor block 2 is preferably made of a highly heat conductive alloy such as BeCu. Thermocouple 16 is provided to ensure that the nozzle body is at the correct temperature. By mounting thermocouple 16 to the nozzle body adjacent distributor block 2, the thermocouple is effectively able to monitor the approximate temperature of the distributor block.

As better seen in FIG. 2, cavity plate 19 is provided with a plurality of mold cavities 25. Cavity plate 19 is dimensioned and configured such that when nozzle 30 is positioned in the cavity plate, mold cavities 25 are positioned around multi-nozzle ring 3. Nozzle ring 3 is provided with a plurality of gate feeders 7 which are aligned with edge gates 8 which in turn feed into mold cavities 25. Flanges 23 and seal 24 help secure nozzle ring 3 within cavity plate 19 in order to keep gate feeders 7 and edge gates 8 in proper alignment. An insulating air gap 26 is provided in order to ensure that nozzle 30 makes little thermal contact with cavity plate 19.

Figure 5:
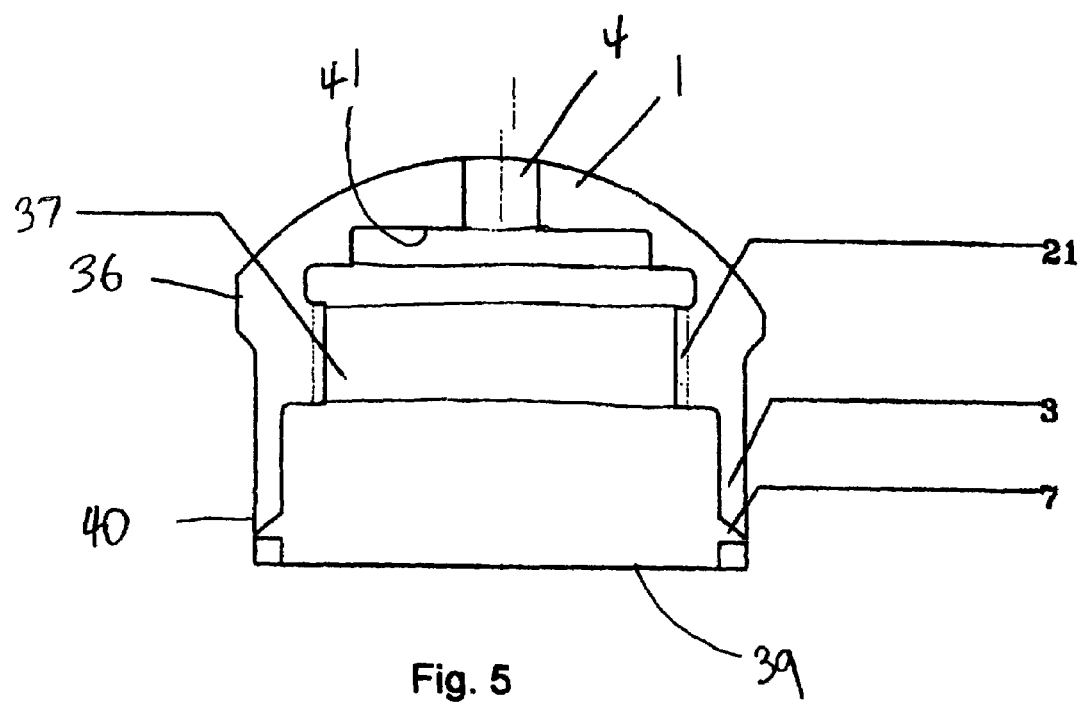
FIG. 5. is a cross-sectional view of the bottom end of the nozzle body portion of the present invention.
Figure 6:
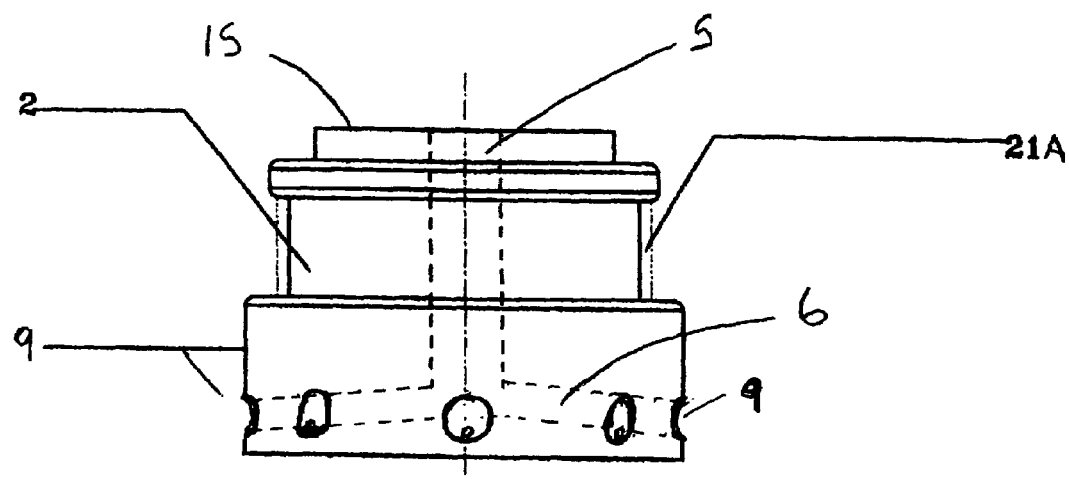
FIG. 6. is a side view of the distributor block portion of the present invention.

Referring now to FIGS. 5 and 6, bottom portion 36 of nozzle body 1 has cavity 37 which is dimensioned and configured to receive distributor block 2. Nozzle ring 3 is formed along the bottom edge of nozzle body 1 adjacent opening 39. Wall 41 defines the upper limit of cavity 37. Threads 21 are provided within cavity 37 to enable distributor block 2 to be threaded into cavity 37 via complimentary threads 21A. When distributor block 2 is fully mounted within cavity 37, seating portion 15 of distributor block 2 abuts wall 41 to ensure that the distributor block is in good thermal contact with nozzle body 1. Distributor block 2 is substantially cylindrical and has circumferential surface 42. Melt wells 6 are formed as concave structures on circumferential surface 42. Surface 42 is in good thermal and sealing contact with inside surface of multi-nozzle ring 3.

Figure 3:
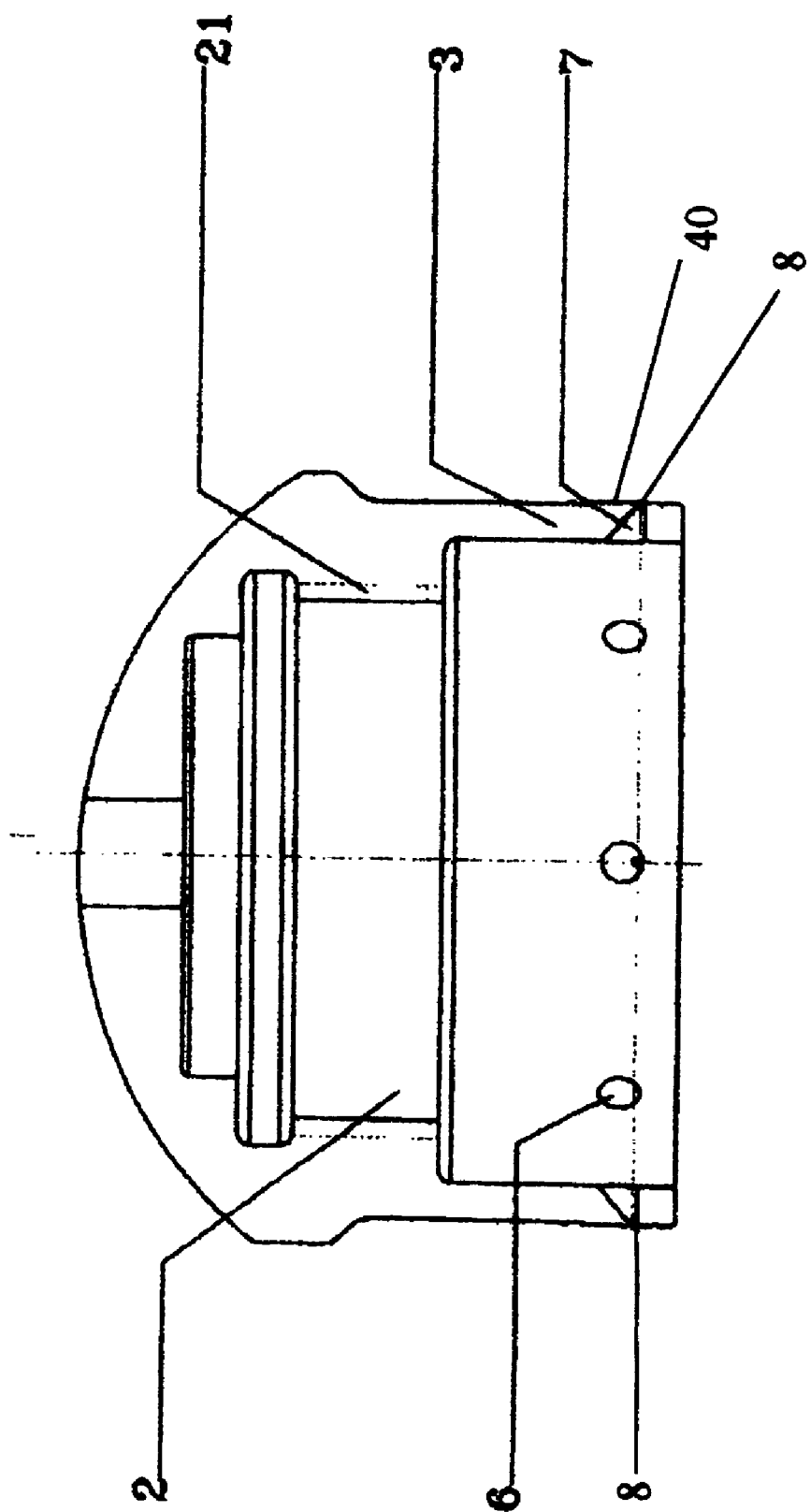
FIG. 3. is a sectional view of a portion of FIG. 1 taken along line A-A.
Figure 4:
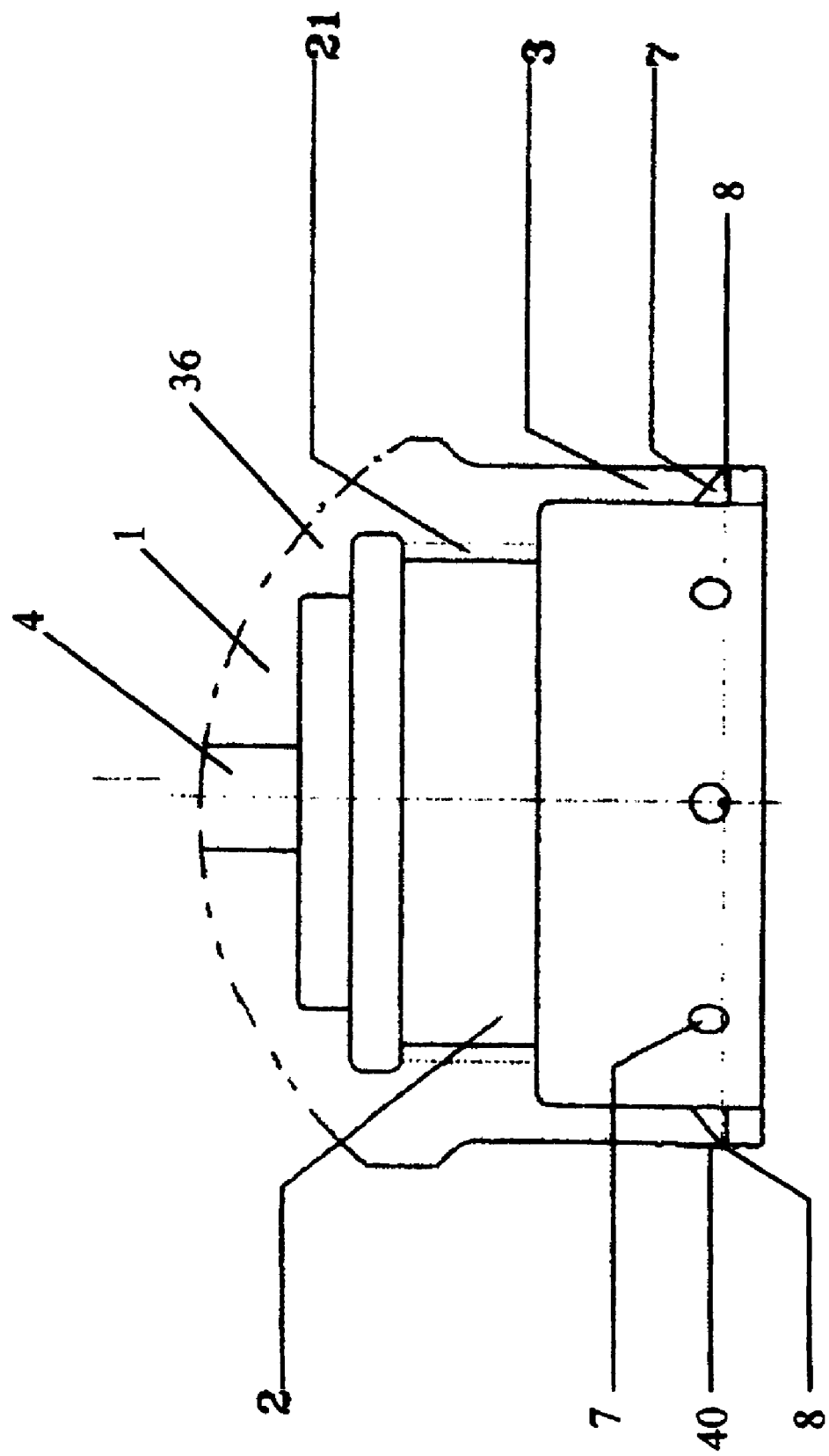
FIG. 4. is a cross sectional view of the distributor block portion of the present invention contained in the bottom end of the nozzle body portion of present invention.

Referring now to FIGS. 3 and 4, nozzle melt channel 5 communicates with distributor melt channels 6 which radiate towards melt wells 9. Melt wells 9 empty into gate feeders 7. Distributor block 2 and nozzle ring 3 are dimensioned and configured to be sufficiently close fitting such that the melt flowing into melt wells 9 do not leak around gate feeders 7 but rather flows entirely into the gate feeders. Since distributor block 2 is made of a highly heat conductive alloy such as BeCu, and since the distributor bock is kept in intimate thermal contact with heated nozzle body 1, the melt flows evenly through the distributor block along distributor melt channels 6. Since the distributor melt channels all radiate from a central melt channel 4, the melt is distributed equally to gate feeders 7. The arrangement of radiating distributor melt channels permits a large number of small mold cavities to be fed from a single nozzle. More importantly, since the nozzle ring feeds the melt into the mold cavities from a central radiating distributor block, several small cavities can be placed very close to the nozzle. In the example shown in FIG. 3, up to eight small cavity molds can be fed from a single nozzle.

Referring back to FIGS. 1 and 2, the present invention has many advantages over the prior art. Firstly, the distributor block permits the molding of several small parts from a single nozzle; thereby decreasing the overall complexity and cost of the molding system. Furthermore, since the gate feeders are distributed evenly about a central melt channel, the melt is more evenly distributed to all of the mold cavities. Finally, the distributor block and multi-nozzle ring permits mold designs with greatly reduced cavity spacing, thereby allowing for a greater number of pats to be produced during each cycle.

A specific embodiment of the present invention has been disclosed; however, several variations of the disclosed embodiment could be envisioned as within the scope of this invention.

It is to be understood that the present invention is not limited to the embodiments described above, but encompasses any and all embodiments within the scope of the following claims.

Therefore, what is claimed is:

1. An injection molding nozzle comprising:
   a) a nozzle body having a central melt channel, said nozzle body having a terminal end,
   b) a distributor block mounted on the terminal end of the nozzle body, the distributor block having a nozzle melt channel and a series of distributor melt channels radiating from the nozzle melt channel, the nozzle melt channel being coupled to the central melt channel and each distributor melt channel terminating in a melt well and
   c) a nozzle ring formed on the end of the terminal end of the nozzle, said nozzle ring surrounding the distributor block, said nozzle ring having a plurality of gate feeders, each of said gate feeders being in communication with one of the melt wells.

2. The injection molding nozzle of claim 1 wherein the distributor block is contained within a cavity formed in the terminal end of the nozzle body, the terminal end of the nozzle forming the nozzle ring, the nozzle ring surrounding the distributor block, the distributor block being in thermal contact with the nozzle body.

3. The injection molding nozzle of claim 2 wherein the distributor block is made of a highly thermally conductive alloy.

4. The injection molding nozzle of claim 3 wherein the distributor block is made of BeCu.

5. The injection molding nozzle of claim 3 further comprising a heating mantle for heating the nozzle body.

6. The injection molding nozzle of claim 2 wherein the distributor block has a circumferential surface along a peripheral edge of the distributor block, the melt wells being concave openings on the circumferential surface.

7. The injection molding nozzle of claim 6 wherein the nozzle ring forms an annular ring around the distributor block, said annular ring having an inside surface, the inside surface of the annular ring closely abutting the circumferential surface of the distributor block, the gate feeders being concave openings on the inside surface of the annular ring, the distributor block and nozzle core being oriented such that the gate feeders of the nozzle ring are aligned with the melt wells of the distributor block.

8. The injection molding nozzle of claim 1 wherein the distributor melt channels radiate symmetrically from the nozzle melt channel.

9. The injection molding nozzle of claim 5 further comprising a thermocouple mounted to the nozzle adjacent the distributor block.

10. An injection molding nozzle comprising:
   a) a nozzle body made of a thermally conductive alloy, said nozzle core having a central melt channel and a terminal end,
   b) a distributor block mounted on the terminal end of the nozzle body, the distributor block being formed of a thermally conductive alloy, the distributor block being in thermal contact with the nozzle body, the distributor block having a centrally placed nozzle melt channel and a series of distributor melt channels radiating from the nozzle melt channel, the nozzle melt channel being coupled to the central melt channel of the nozzle body, each distributor melt channel terminating in a melt well and
   c) a nozzle ring positioned on the end of the terminal end of the nozzle, said nozzle ring surrounding the distributor block, said nozzle ring having a plurality of gate feeders, each of said gate feeders being in communication with one of the melt wells.

11. The injection nozzle of claim 10 wherein a cavity is formed on the terminal end of the nozzle body, the cavity being dimensioned and configured to contain the distributor block in close thermal contact, the nozzle ring being formed from the nozzle body surrounding the distributor block.

12. The injection nozzle of claim 10 wherein the distributor block is made of BeCu.

13. The injection nozzle of claim 10 further comprising a heating mantle for heating the nozzle body.

14. The injection nozzle of claim 10 wherein the distributor block has a circumferential surface surrounding the distributor block, the melt wells being concave openings on the circumferential surface.

15. The injection nozzle of claim 14 wherein the nozzle ring forms an annular ring around the distributor block, said annular ring having an inside surface, the inside surface of the annular ring closely abutting the circumferential surface of the distributor block, the gate feeders being concave openings on the inside surface of the annular ring, the distributor block and nozzle core being oriented such that the gate feeders of the nozzle ring are aligned with the melt wells of the distributor block.

16. The injection nozzle of claim 10 wherein the distributor melt channels radiate symmetrically from the nozzle melt channel.

17. The injection nozzle of claim 13 further comprising a thermocouple mounted to the nozzle adjacent the distributor block.

18. An injection molding nozzle comprising:
   a) a nozzle body made of a thermally conductive alloy, said nozzle body having a central melt channel and a terminal end,
   b) a heating mantle for heating the nozzle body,
   c) a distributor block mounted on the terminal end of the nozzle body, the distributor block being formed of a thermally conductive alloy, the distributor block being in thermal contact with the nozzle body, the distributor block having a centrally placed nozzle melt channel and a plurality of distributor melt channels radiating symmetrically from the nozzle melt channel, the nozzle melt channel being coupled to the central melt channel of the nozzle body, the distributor block having a circumferential surface, each distributor melt channel terminating in a concave melt well formed on the circumferential surface,
   d) a nozzle ring positioned on the end of the terminal end of the nozzle, said nozzle ring forming an annular structure around the distributor block, the nozzle ring having an inside surface, the inside surface of the nozzle ring closely abutting the circumferential surface of the distributor block, the nozzle ring having a plurality of concave gate feeders formed on the inside surface, the distributor block and nozzle body being oriented such that the gate feeders of the nozzle ring are aligned with the melt wells of the distributor block, and
   e) a thermocouple mounted to the nozzle body adjacent the distributor block.

19. The nozzle of claim 18 wherein the distributor block is made of a BeCu alloy.

20. The nozzle of claim 18 wherein the distributor block is substantially cylindrical.

* * * * *